(12) United States Patent
Schaefer (10) Patent No.: US 6,747,576 B2
(45) Date of Patent: Jun. 8, 2004

(54) WIRE DETECTION PROCEDURE FOR LOW-FLYING AIRCRAFT

(75) Inventor: Christoph Schaefer, Friedrichshafen (DE)

(73) Assignee: Astrium GmbH, Friedrichshafen (DE)

( * ) Notice: Subject to any disclaimer, the term of this patent is extended or adjusted under 35 U.S.C. 154(b) by 225 days.

(21) Appl. No.: 09/986,763

(22) Filed: Nov. 9, 2001

(65) Prior Publication Data
US 2002/0130792 A1 Sep. 19, 2002

(30) Foreign Application Priority Data

Nov. 9, 2000 (DE) ......................................... 100 55 572

(51) Int. Cl.[7] .............................................. G08B 21/00
(52) U.S. Cl. ....................... 340/945; 340/961; 340/963; 701/301
(58) Field of Search ................................. 340/945, 963, 340/970, 961; 701/301, 9, 4, 14

(56) References Cited

U.S. PATENT DOCUMENTS 5,063,604 A * 11/1991 Weiman ..................... 382/170
5,170,352 A * 12/1992 McTamaney et al. ......... 701/26
5,296,909 A * 3/1994 Fazi et al. .................. 345/4.01
5,508,706 A 4/1996 Tsou et al. .................. 342/192
6,018,698 A 1/2000 Nicosia et al. .............. 701/214
6,219,594 B1 * 4/2001 Nicosia et al. ................ 701/16
6,347,264 B2 * 2/2002 Nicosia et al. ................ 701/16

FOREIGN PATENT DOCUMENTS

DE    19605218    4/1997
GB    2341506    3/2000

* cited by examiner

*Primary Examiner*—Daniel J. Wu
*Assistant Examiner*—Phung Nguyen
(74) *Attorney, Agent, or Firm*—Crowell & Moring LLP (57) ABSTRACT

In an obstacle device, a front end range imaging sensor is used to scan the viewing field relative to the aircraft, while a navigation system provides information concerning the postion and altitude of the aircraft. A data processor uses these data to generate 3-d scene vectors, such that every range image is converted into a measurement point set, from which the presence of cables or wires is detected using a wire detection procedure based on the Hough Transform. For this purpose, an HT acceleration board is provided, which needs not perform complex floating point operations. The processed results are then input to an evaluation module, which determines whether any detected wires are proximate to the position of the aircraft.

7 Claims, 5 Drawing Sheets

System architecture of wire detection system

Fig. 1: System architecture of wire detection system

Fig. 2: Block diagram representing the stepwise execution of the invented procedure Fig. 3: Measurement point with corresponding one-dimensional set of straight lines Fig. 4: Parametrization of slack wire segment in lateral wire Fig. 5: Function graph of two measurement points in discrete parameter space Fig. 6: Address space of hardware memory with discretized function graph (before and after translation)

Fig. 7: Hardware architecture of acceleration board

WIRE DETECTION PROCEDURE FOR LOW-FLYING AIRCRAFT

BACKGROUND AND SUMMARY OF THE INVENTION

This application claims the priority of German patent document 100 55 7572.1-22 filed Nov. 9, 2000, the disclosure of which is expressly incorporated by reference herein.

The invention relates to a process for real-time detection of obstacles for low-flying, airborne vehicles such as long distance communication wires and power cables. Such wires and cables constitute a potential hazard for aircraft operating at low altitudes, especially for helicopters.

A procedure for obstacle warning for low-flying aircraft is disclosed in DE 196 05 218 C1. There, range images of the scenery in front of the vehicle are generated by means of a sensor. The outlines ("contours") of obstacles are extracted from the range images using high-pass filters to search for discontinuities occurring between adjacent pixels. Using a navigation system, the position of the obstacle contours can be graphically blended with the natural, forward-looking view of the external scenery. Actual detection of obstacles is not performed.

One object of the present invention is to provide a process for the detection of wires or cables, securely and in real time.

Another object of the inention is to provide such a detection process which requires a minimum of hardware.

These and other objects and advantages are achieved by the obstacle detection process according to the invention in which a front end range imaging sensor is used to scan the viewing field relative to the aircraft, while a navigation system provides information concerning the postion and attitude of the aircraft. A data processor uses these data to (generate 3-d scene vectors, such that every range image is converted into a measurement point set, from which the presence of cables or wires is detected using a wire detection procedure based on the Hough Transform. For this purpose, an HT acceleration board is provided, which needs not perform complex floating point operations. The processed results are then input to an evaluation module, which determines whether any detected wires are proximate to the position of the aircraft.

The procedure according to the invention has the following advantages:

maximum security in the process of wire detection by exploiting the three-dimensional geometry of the wire's trajectory through space, including its slack;

possibility of precisely determining position and length of wire segments;

real-time performance with limited hardware; and equal potential for day- and nighttime use.

Other objects, advantages and novel features of the present invention will become apparent from the following detailed description of the invention when considered in conjunction with the accompanying drawings.

DETAILED DESCRIPTION OF THE DRAWINGS

Figure 1:
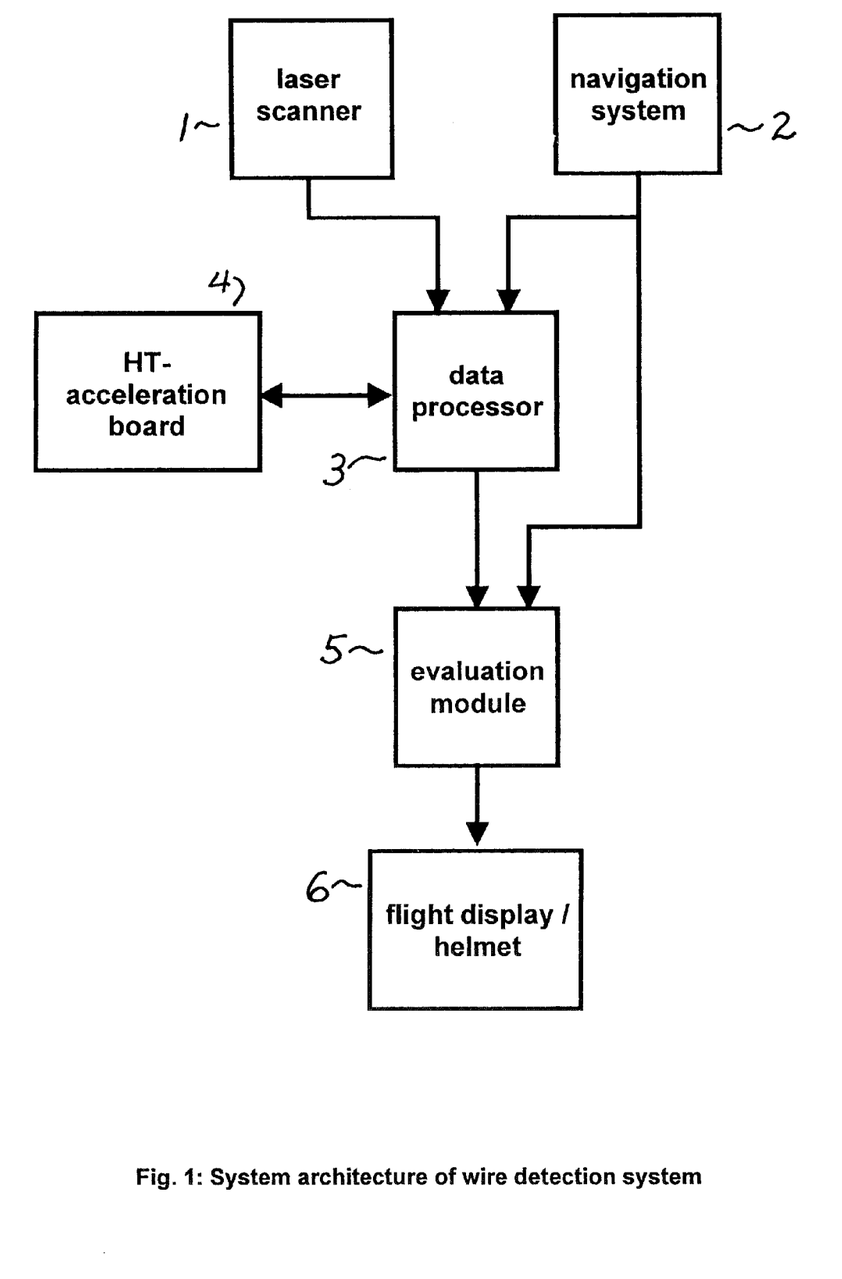
FIG. 1 is a schematic block depicting the architecture of a system which performs the procedure according to the invention.

The associated system architecture is shown in FIG. 1. The system comprises the following components:

Range image sensor 1 (e.g. laser scanner);

Navigation system 2;

Data processor 3;

Acceleration board for Hough transform (HT) 4;

Evaluation module 5 and pilot interface 6 (e.g. flight display/head-up display/helmet)

As an imaging front-end, the sensor 1 actively scans the scenery, and generates image content as range values. Range images are desirable for the subsequent automatic image evaluation for wire detection. Potential sensor candidates are a laser scanner (preferably operating in the infrared range), or an imaging radar with millimeter wavelength. Although radar has advantages for adverse weather operation, in view of the current state of development, only a laser scanner performs with the desired vertical and horizontal imaging resolution. Being an active sensor, either sensor is suited either for day or for night operation.

An appropriate laser scanner is designed for large range (>1 km) and high image resolution (0.5° horizontally×0.1° vertically). It typically produces range images of 64×384 pixels at a frame rate of 4 Hz. Due to its 16 bit range resolution, at the output interface it generates a data rate in the order of 2 Mbps (Mega bits per second). The direction of measurement associated with each image pixel must be known with respect to the sensor's three-dimensional coordinate system, either from the design of the scanning geometry of the sensor or possibly from additional dynamical, high-precision measurements during each scan.

The navigation system 2 serves to determine the position and attitude of the aircraft as a function of time. A typical sampling rate is 10 Hz. Every image pixel (range value) is transformed into a 3-d scene vector using the parameters of the associated scan direction jointly with the corresponding navigation data. A 3-d scene vector (=measurement point) is specified by means of its x,y,z-coordinates in a terrestrial coordinate system. In this way, every range image is converted into a so-called measurement point set, from which cables or wires—if present—may be extracted.

For data processing, a processor 3 of intermediate computing power is utilized. This processor first performs the above transform of range values into measurement points, then applies a filter to eliminate the points belonging to the ground. The remaining measurement points are the input to a wire detection procedure which is based on the Hough transform.

The Hough transform (HT) is well suited for wire detection but is computationally demanding. Because an application of the HT would exceed the computing power of the processor, a dedicated HT-acceleration board 4 is included in the system. In this way, the Hough transform can be performed in real time even with airborne hardware. The HT fully exploits the three-dimensional content of the sensor data. In horizontal direction, the linearity (i.e. straightness)

of wires makes it possible to discriminate them from other objects. By itself, however, this feature is not sufficient for secure detection, particularly if measurement points are noisy or missing. For this reason, in the present procedure, the slacking of the wire segments in accordance with the COSH-law is utilized as an additional feature for detection. This part of the procedure is computionally so demanding as to require a dedicated acceleration board. The acceleration board is designed specifically for the Hough transform applied to wire detection, and requires no floating point operations. The high processing performance of the board is due to these features.

As a result of the wire detection procedure, eight parameters are generated for each detected segment of wire. These parameters define the geometry of the wire: three parameters define the vertical plane of the wire segment, and five additional parameters specify the corresponding slack segment including initial and final points. These parameters serve as input to an evaluation module 5, which determines whether the individual wire segments are dangerously close to the present position of the aircraft or to the proposed flight trajectory. It may sound an acoustic alarm in the cockpit or (via interface with the autopilot) may initiate an automatic evasive flight maneuver. In many instances, it will be favorable to graphically display the result of the wire detection procedure to the pilot, e.g. by providing a horizontal overlay onto a digital map displayed by a flight display or by superimposing the wire on an existing three-dimensional, perspective, forward view.

For the laser scanner 1, the navigation system 2, the processor 3 and the evaluation module 5; commercially available units can be used. Accordingly, the discussion herein deals with the following:

1. The algorithms for three-dimensional wire detection from range images, based on the Hough transform (section 1). These algorithms are the basis for the software required by the processor and the mathematical function of the acceleration board.

2. The acceleration board for the real-time execution of the algorithms (section 2). The board's mathematical functions and supporting hardware architecture are described in detail.

1. Algorithm 1.1 Steps of Algorithm

Figure 2:
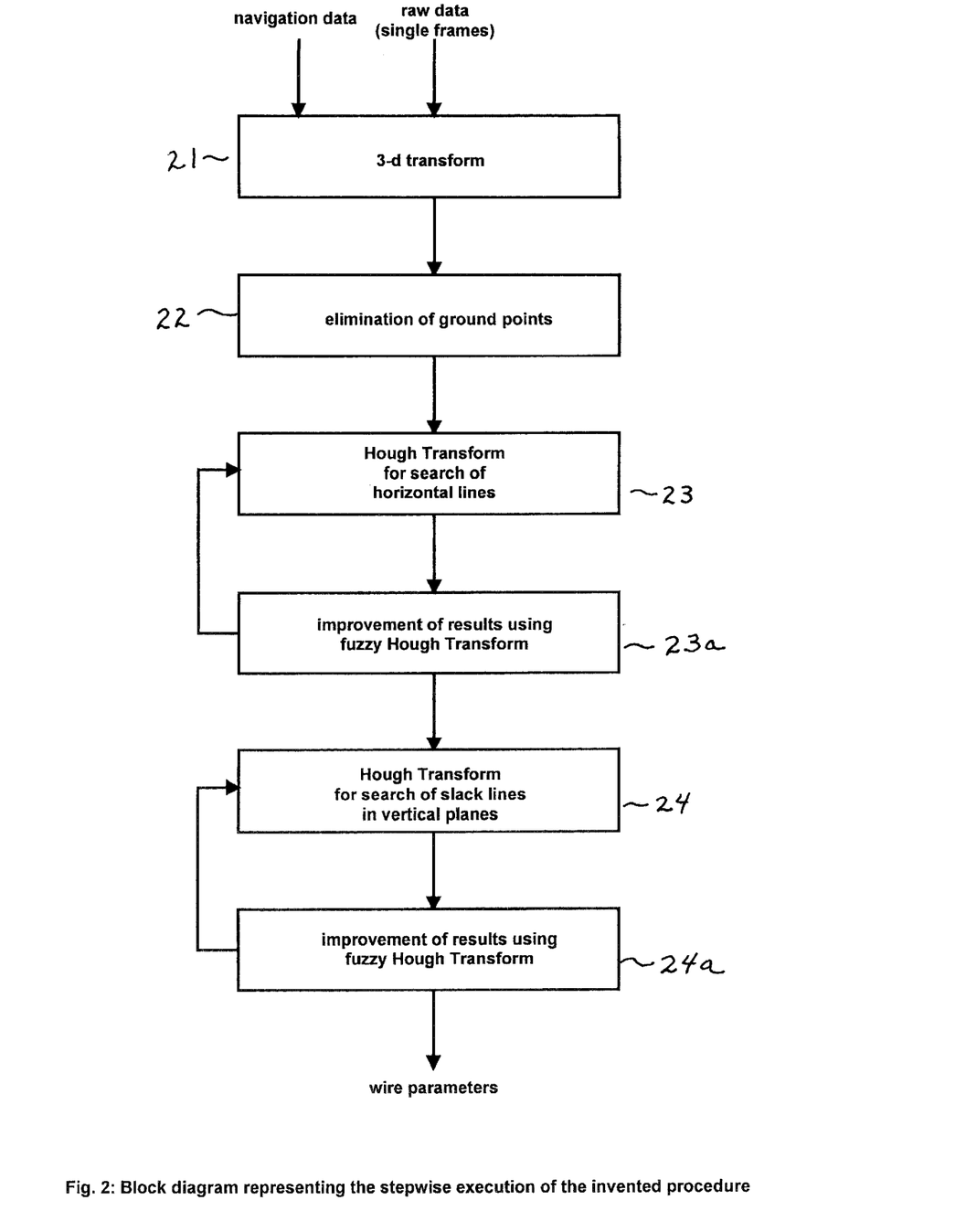
FIG. 2 is a block diagram representing the stepwise execution of the procedure according to the invention.

The individual steps of the algorithm for wire detection are illustrated in FIG. 2.

The raw data of the sensor (range values) and the navigation data of the aircraft constitute the input, and the geometric wire parameters which have been computed are the output. The algorithm itself is frame-oriented; that is, each range image is processed by itself, yielding a number of detected wire segments. The frame-oriented processing concept is simpler to implement than a cumulative method the data of several consecutive frames are accumulated in a data bank and where the wire detection algorithm is based on the content of the data bank. Even though the cumulative method theoretically should lead to superior (i.e. more complete and less noisy) data, the process of accumulation in practice requires highly precise navigation data and time annotation. This can be avoided using the presented method which performs a very robust wire detection and therefore can perform on single frames. The frame-oriented procedure also yields minimum latency of detection.

The 3-d transform 21 converts the input data into a set of measurement points. Before actual wire detection can start, points in the scene belonging to the ground ("ground points") must be eliminated (block 22), for two reasons:

1. The data rate at the input to the actual wire detection module (Hough transform) is then reduced dramatically.

2. The ground points generally form a surface. Within this surface, there always exist curves which from a purely geometric point of view could represent wires. These "virtual" wires, however, are not to be detected.

Various known algorithms can be employed to eliminate the ground points, and are not dealt with in this paper. These algorithms differ with respect to complexity and performance. If the altitude of the aircraft is known, the simplest measure is to eliminate all measurement points occurring below a certain altitude threshold. This is feasible because after the 3-d transform, the relative height of the measurement points with respect to the aircraft is known. The altitude threshold can be designed to increase with increasing forward distance from the aircraft to take account of potentially ascending terrain. Should the altitude threshold at a large distance in front of the vehicle be so large as to filter out some wires, this would not be critical, due to their distance. In one of the following frames, as the aircraft moves closer, they would eventually exceed the threshold. This algorithm is quite simple.

A more complex and more efficient procedure would be the implementation of an algorithm for ground detection. A detection of the ground is in principle feasible because the collection of ground points generally form a "continous" surface which can be detected using known algorithms. The Hough transform, for example, constitutes such an algorithm, since it can serve to detect arbitrary, approximately plane surfaces. (The transform, however, assumes an explicit form which is different from that required for wire detection.) But since presently, ground detection is only employed to eliminate the ground points, an algorithm requiring as little computational power as possible is desirable (See P. Lux, C. Schaefer: Range imaging for autonomous navigation of robotic land vehicles. Signal Processing 22, 1991, S. 299–311) which satisfies reduced requirements: it need not parametrize the ground; rather it simply identifies all points which do not belong to the ground.

After elimination of the ground points, there remains a subset of the original set of measurement points of the current frame to which the actual wire detection algorithm is now applied. Of the approximately 25,000 original measurement points, usually only a few hundred will have remained. In view of the required real-time performance, an upper bound for the number of measurement points to be processed (e.g. 250 or 500 points) must be defined for wire detection. If in rare instances, more than this number of measurement points remain after the elimination of the ground points, additional points need to be eliminated, e.g. by a stochastic measure. Thereafter, a wire may appear subsampled, since some of its points have been eliminated arbitrarily. In view of the robustness of the wire detection algorithm, this will only be critical for the detection of wires which are represented by very few points to begin with. These will usually be wires at larger distance which will reappear in a later frame with more points. The proposed restriction of the data rate hence will result in a reduction of the maximum range of detection of the system. On the other hand, this reduction in detection range can avoided by supplying more processing power. Hence there is a natural trade-off between processing power on one hand, and detection range on the other. As an alternative to the stochastic elimination of measurement points, points of a certain altitude or distance could be prioritized and not be subjected to the stochastic elimination process.

Hence the starting point for the following Hough transform (HT) is a 3-d point set of limited size. The first HT (Block 23) only evaluates the horizontal, (x,y)-components of the measurement points, and identifies straight lines (section 1.2). Horizontal straight lines indicate potential wire segments. Later, during the so-called wire search, every vertical plane corresponding to one of these lines is searched for wires or cables with the proper COSH-slack (section 1.3). This means that all measurements points lying within or close to such a plane, are projected onto this plane, and the resulting set of 2-d points is searched for COSH-slack using the second HT (Block 24).

The HT is commonly used for line search in an unstructured set of points in the plane. It is, in fact, applicable in a much wider sense, e.g. for the search of COSH-curves, corresponding to slack wire segments under gravity. In this instance, it assumes a different mathematical formulation; with the straight line search it shares only the principle of compiling a histogram. Its major drawback, the computational complexity, is eliminated presently by employing the proposed dedicated HT-acceleration board.

The HT in its conventional "discrete" form produces errors which are due to the discretization which is inevitable in numerical processing. These errors are eliminated by means of a subsequent "fuzzy" HT (Blocks 23a, 24a) which improves the results obtained with the discrete HT and requires relatively little computation time. Therefore, it can be implemented in software. It may be omitted for results with limited precision requirements.

After computing the Hough transform, the question arises in practical applications of how to evaluate it. An unsophisticated method of evaluation leads to problems of resolving adjacent objects. This problem is presently solved by means of an iterative procedure which is described in detail in section 1.2.3.

1.2 Hough Transform for Straight Line Search 1.2.1 Parametrization

Let $$\{(x_i, y_i) | i = 0, \ldots, I-1\} \tag{1-1}$$

constitute I measurement points in the horizontal x,y-plane whose respective distances from the origin of the x,y-coordinate system does not exceed $\rho_{max} > 0$. A Hough transform will be conducted in order to find straight lines among these points.

Figure 3:
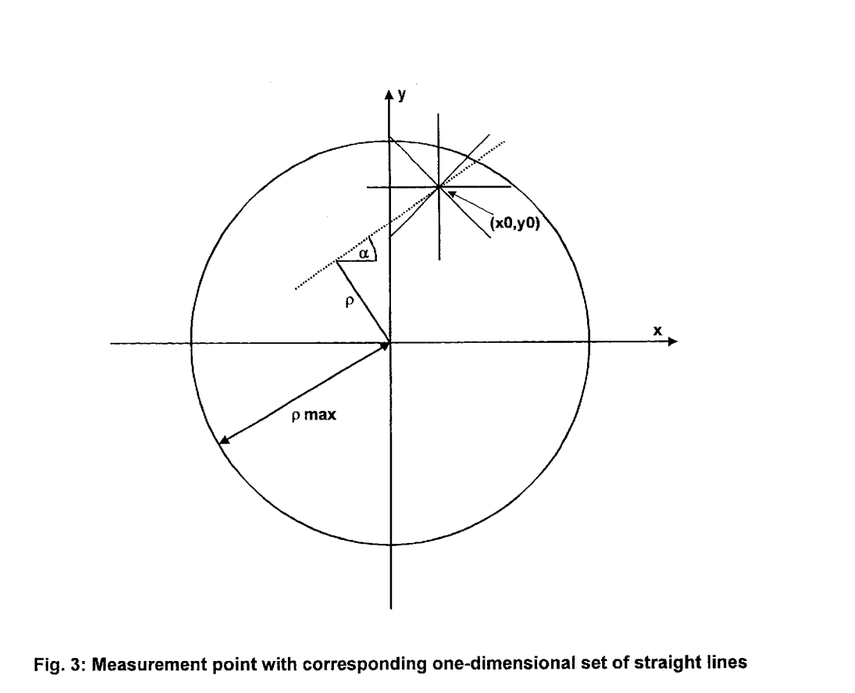
FIG. 3 shows a measurement point with associated set of straight lines for explaining the Hough transform.

In this context, for every single point the one-dimensional set of all potential lines intersecting this particular point is considered. This set is illustrated in FIG. 3 for the measurement point $(x_0, y_0)$. First, an appropriate parametrization of the set of lines is chosen. The usual parametrization of a line y=mx+b with slope m and axial offset b is numerically not able to handle the case m=∞. For this reason, the angle a between the line and the x-axis, and the distance $\rho$ of the line the from the origin are chosen as the line parameters. A line $\vec{r}(\lambda)$ associated with parameters $(\alpha, \rho)$ can be represented as follows:

$$\vec{r}(\lambda) = \begin{pmatrix} x(\lambda) \\ y(\lambda) \end{pmatrix} = \rho \begin{pmatrix} -\sin\alpha \\ \cos\alpha \end{pmatrix} + \lambda \begin{pmatrix} \cos\alpha \\ \sin\alpha \end{pmatrix} \quad (-\infty < \lambda < \infty) \tag{1-2}$$

($\lambda$ parametrizes the line in its length.) Given a point $(x_0, y_0)$, for every angular parameter a there exists a unique value of the distance parameter $\rho = \rho(\alpha)$ such that the line parametrized by $(\alpha, \rho(\alpha))$ intersects the point $(x_0, y_0)$. It is easy to show that $$\rho(\alpha) = -x_0 \sin\alpha + y_0 \cos\alpha \tag{1-3}$$

Using $r_0 = \sqrt{x^2_0 + y^2_0}$ and the proper phase value $\alpha_0$ we may switch to polar coordinates for the measurement point:

$$x_0 = r_0 \cos\alpha_0$$
$$y_0 = r_0 \sin\alpha_0 \tag{1-4}$$

In this notation, equation (1-3) may alternatively be written $$\rho(\alpha) = -r_0 \sin(\alpha - \alpha_0) \left(-\frac{\pi}{2} \leq \alpha < \frac{\pi}{2}\right) \tag{1-5}$$

1.2.2 The Conventional Hough Transform

In the Hough transform domain with parameters $\alpha$, $\rho$, the Hough transform of an arbitrary point $P_i = (x_i, y_i)$ such that $x_i = r_i \cos\alpha_i$, $y_i = r_i \sin\alpha_i$ and $f_i(\alpha) = -r_i \sin(\alpha)$ yields the following graph:

$$\Gamma_i = \left\{ (\alpha, \rho) \Big| -\frac{\pi}{2} \leq \alpha < \frac{\pi}{2}, \rho = f_i(\alpha - \alpha_i) \right\} \tag{1-6}$$

The desired histogram function $\eta(\alpha, \rho)$ which is defined in the Hough transform domain superimposes the graphs of all measurement points and therefore is given by $$\eta(\alpha, \rho) = \sum_{i=0}^{I-1} \delta(\rho - f_i(\alpha - \alpha_i)) \tag{1-7}$$

By definition $$\delta(0) = 1 \text{ and } \delta(x) = 0 \text{ for all } x \neq 0 \tag{1-8}$$

is essentially a delta function.

The maximum $(\alpha_{max}, \rho_{max})$ of $\eta(\alpha, \rho)$ is now to be determined:

$$\eta(\alpha_{max}, \rho_{max}) = \max_{\substack{-\pi/2 \leq \alpha < \pi/2 \\ -\rho_{max} < \rho < \rho_{max}}} \eta(\alpha, \rho) \tag{1-9}$$

This is because the set of parameters $(\alpha_{max}, \rho_{max})$ corresponds to a line which intersects a maximum number of points. This is the histogram principle associated with the Hough transform.

In practice, in order to determine this maximum, quantization of the $(\alpha, \rho)$-parameter space is required. This is accomplished by introducing bins of the uniform size $\Delta\alpha \cdot \Delta\rho$, which are characterized by their center points $(\alpha_m, \rho_n)$. The continuous function $\eta(\alpha, \rho)$ turns into a discrete function $H(\alpha_m, \rho_n)$. The calculation and evaluation of this function is executed by the acceleration board. The interface with this board is defined in section 1.2.4. Let $(\alpha_M, \rho_N)$ define the maximum of the discrete histogram function $H(\alpha_M, \rho_N)$:

$$H(\alpha_M, \rho_N) = \max_{m,n} H(\alpha_m, \rho_n) \tag{1-10}$$

1.2.3 Fuzzy Hough Transform and Iteration

The result $(\alpha_M, \rho_N)$ obtained in this fashion is, however, amenable to improvement, for two reasons:

1. The result depends on the choice of the discretization parameters $\Delta\alpha$, $\Delta\rho$ (which it should not).
2. The "exact" approach of the conventional Hough transform (1-7) does not take into account the measurement errors of the measurements points $(x_i, y_i)$ which are always present.

These problems are resolved by means of a "fuzzy" Hough transform, where the delta function $\delta(x)$ of equation (1-7) is replaced by a Gaussian distribution. Here not only those pairs of parameters $(\alpha,\rho)$ contribute to the histogram function of a measurement point whose associated lines exactly intersect that point, but also all parameter pairs whose associated lines nearly intersect it. In this way, it is taken into account that due to a measurement error, the actual point might actually be somewhat displaced with respect to the obtained coordinate values $(x_i,y_i)$.

In order to take account of this statistical aspect, the exact Hough transform $\eta(\alpha,\rho)$ formulated in equ. (1-7) is converted into a fuzzy Hough transform $h(\alpha,\rho)$:

$$h(\alpha, \rho) = \sum_{i=0}^{l-1} \exp\left(\frac{-[\rho - f_i(\alpha - \alpha_i)]^2}{2\sigma^2}\right) \qquad (1\text{-}11)$$

$\sigma$ denotes the standard deviation occurring in measuring the coordinates $\underline{x}_i$ and $y_i$.

A result $(\overline{\alpha}, \overline{\rho})$ for the desired line parameters which is superior to (1-9) and (1-10) is hence obtained by searching the fuzzy HT for a maximum:

$$h(\overline{\alpha}, \overline{\rho}) = \max_{\substack{-\pi/2 \leq \alpha < \pi/2 \\ -\rho_{max} < \rho < \rho_{max}}} h(\alpha, \rho) \qquad (1\text{-}12)$$

Since $h(\alpha,\rho)$ constitutes an analytical—hence smooth—function, the maximum may be determined using methods from calculus. In particular, for the numerical solution of the optimization problem (1-12) the parameter space (=Hough transform domain) must not be quantized, and a unique solution can be determined which does not depend on any particular choice of quantization parameters.

Nevertheless, for a practical solution of problem (1-11) a reasonable estimate for $(\overline{\alpha}, \overline{\rho})$ is required. The acceleration board supplies this estimate $(\alpha_M, \rho_N)$. As opposed to generating the estimate $(\alpha_M, \rho_N)$, the upgrading procedure $(\alpha_M, \rho_N) \rightarrow (\overline{\alpha}, \overline{\rho})$ is not computationally costly, and can therefore be executed by the programmable host processor of the acceleration board.

The search for horizontal lines continues as follows. The parameter set $(\overline{\alpha}, \overline{\rho})$ just obtained defines a single line which has been found. Of course, there may be other lines to be found. It is first determined which measurement points belong to the line just found. These measurement points are deleted from the current collection of measurement points, and the procedure for finding a line is repeated. Every such iteration yields another line. In succession, each line is supported by a decreasing number of points. The search ends when the most recent line is supported by no more than M>0 points. The value of the parameter M is defined by the user and indicates the minimum number of measurement points required to support a potential wire or cable.

In practice, after having determined the first line it is not really necessary to recompute the complete histogram function (now based on the reduced collection of points). Let $\eta(\alpha,\rho)$ and $\eta_1(\alpha,\rho)$ denote the histogram functions during the search of the first and second lines, respectively. $\eta_1(\alpha,\rho)$ is obtained from $\eta(\alpha,\rho)$ in accordance with the following equality:

$$\eta_1(\alpha, \rho) = \eta(\alpha, \rho) - \sum_{\substack{eliminated \\ measurement \\ points}} \delta[\rho - f_i(\alpha)] \qquad (1\text{-}13)$$

Thus, the first histogram function is updated merely by adding in the points associated with the first line, however with negative sign. This operation is executable very efficiently using the acceleration board. The old histogram is still present in the memory of the board. It is merely to be updated by the eliminated points, however with negative sign. (This mode is supplied by the proposed implementation, cf. section 2.3.1) The computational complexity of generating $\eta_1(\alpha,\rho)$ corresponds to the generation of a histogram from the same number of points as have presently been eliminated, and not from as many points as there would remain after the elimination procedure. Hence in the acceleration board, the complexity of finding all lines remaining to be found after having extracted the first, is about equal to the complexity of finding the first. This complexity is, of course, proportional to the number of measurement points present altogether.

1.2.4 Interface with Acceleration Board

The general function of the acceleration board—described in section 2.2—will presently be applied to the specific problem of finding horizontal lines. In order to do this, the following board input needs to be defined:

Parameter space

Discrete one-parametric set of curves

For every measurement point: associated curve and associated offsets

Parameter Space

The parameters in the Hough transform domain are given by $$-\frac{\pi}{2} \leq \alpha < \frac{\pi}{2}; -\rho_{max} < \rho < \rho_{max} \qquad (1\text{-}14)$$

The associated quantized parameters are positive numbers $\Delta\alpha$, $\Delta\rho$.

One-Parametric Set of Curves

For l=0, . . . , L-1, the set of numbers $$\rho_l = l \cdot \Delta\rho \qquad (1\text{-}15)$$

constitutes a quantization of the $\rho$-axis. Let L be defined by $$(L-1)\Delta\rho = \rho_{max} \qquad (1\text{-}16)$$

For an arbitrary measurement point $(x_i,y_i)$, let $x_i = r_i \cos \alpha_i$, $y_i = r_i \sin \alpha_i$ denote its representation in polar coordinates. Letting $$l = l(i) = \left\lfloor \frac{r_i + \frac{1}{2}}{\Delta\rho} \right\rfloor \qquad (1\text{-}17)$$

(for any real number x, $n = \lfloor x \rfloor$ denotes the largest integer such that $n \leq x$) it is guaranteed that the discrete value $\rho_{l(i)}$ approximates the continuous value $r_i$ optimally. The set of curves $f_l(\alpha)$ required by the board is now given by $$f_l = -\rho_l \sin(\alpha)(l=0 \ldots L-1). \qquad (1\text{-}18)$$

Of course, the SIN-curve is handled as a discrete function, and hence constitutes a vector.

Association of Curves with Measurement Points

For the board to compute the desired histogram function (1-7), the curve $f_{l(i)}(\alpha - \alpha_i)$ must be associated with any given measurement point $P_i = (x_i, y_i)$. (Offsets in $\rho$ are not required.) The board now enters the respective graphs $$\Gamma_i = \{(\alpha, -\rho_{l(i)}\sin(\alpha - \alpha_i)) \mid -\frac{\pi}{2} \leq \alpha < \frac{\pi}{2}\} \quad (1\text{-}19)$$

into the parameter space and sums up the histogram.

1.3 Hough Transform for Slack Wire Detection 1.3.1 Parametrization

Figure 4:
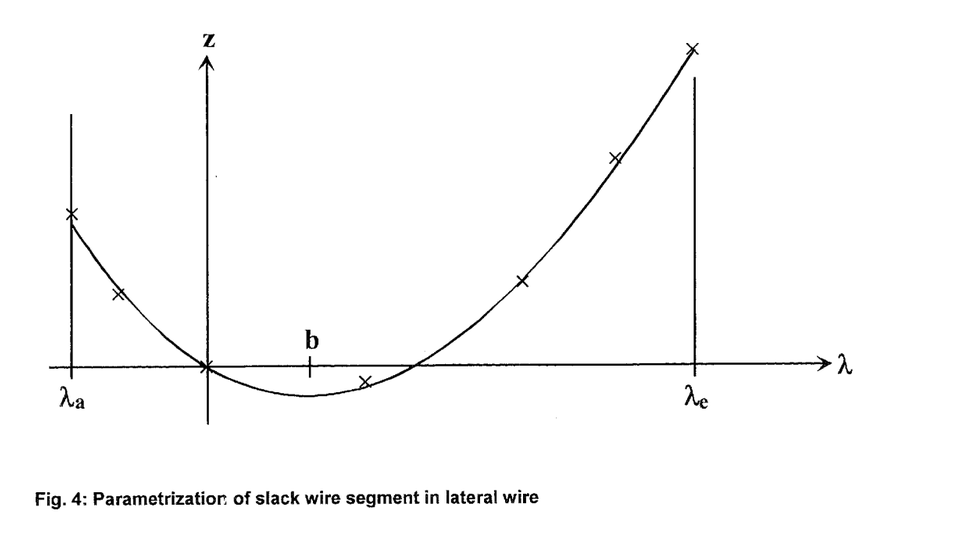
FIG. 4 shows parametrization of wire segment, lateral view, slack exaggerated.

Having determined the horizontal, linear directions of potential wires, it is now required to search for points in each associated vertical plane which can be joined to slack wires or connected segments of slack wires. This section deals with the problem of finding COSH-curves in a given, vertical $\lambda$,z-plane with measurement points $P_i=(\lambda_i,z_i)$ (FIG. 4). In this setting, the $\lambda$-axis runs in the direction of the originally detected horizontal line. The z-axis defines the vertical direction.

FIG. 4 depicts a segment of slack wire in lateral view. $\lambda_a$ and $\lambda_e$ denote the beginning and end of the segment of wire. For a wire material with negligible stiffness, a segment of wire is well known to be parametrized by $$z(\lambda) = a\cosh\left(\frac{\lambda - b}{a}\right) + c \quad (\lambda_a < \lambda < \lambda_e) \quad (1\text{-}20)$$

In this formulation, b defines the position of the lowest point of the wire on the $\lambda$-axis, and c parametrizes the height of the wire (a+c is the z-coordinate of the lowest point of the wire). The parameter a defines the degree of slack of the wire. Every triplet of parameters (a,b,c) defines a unique wire segment.

We have thus defined a three-dimensional parameter space with coordinates (a, b, c). The Hough transform maps individual measurement points into surfaces lying in this 3-space, and the histogram function is defined in this 3-space.

For brevity of notation we shall occasionally write $$z(\lambda)=g_a(\lambda-b)+c \quad (1\text{-}21)$$

where $$g_a(x) = a\cosh\left(\frac{x}{a}\right) \quad (1\text{-}22)$$

1.3.2 Hough Transform for Search of Slack Wires

For a given measurement point $P_i=(\lambda_i,z_i)$, the collection of all parameter sets (a, b, c) such that the associated curve $$z=g_a(\lambda-b)+c \quad (1\text{-}23)$$

intersects the measurement point, constitutes a 2-d surface in the (a, b, c)-coordinate system, formally given by $$\Gamma_i=\{(a,b,c) \mid a_{min}<a<a_{max}, b_{min}<b<b_{max}, c=c_i(a,b)=z_i-g_a(\lambda_i-b)\} \quad (1\text{-}24)$$

In this formulation, the interval $b_{min}<\lambda<b_{max}$ defines a horizontal segment of the present vertical plane which represents a window of search. Indeed, only wires will be detected whose respective lowest points lie within this window. This interval is defined by the user. A possible choice is $$b_{min}=\min_i\{\lambda_i\}, b_{max}=\max_i\{\lambda_i\}. \quad (1\text{-}25)$$

The admissible range of values for the parameter of slack $a_{min}<a<a_{max}$ is to be defined by the user, in accordance with the geometrical properties of the wires and cables under search.

The bounding interval $(c_{min},c_{max})$ of the parameter space in c-direction is defined sufficiently large such that for any considered set of measurement points, taking into account the admissible values for a and b, no graph $\Gamma_i$ can escape the parameter space in the c-direction.

Letting $$f_a(b) = -g_a(-b) = -g_a(b) = -a\cosh\left(\frac{b}{a}\right) \quad (1\text{-}26)$$

the associated histogram function is $$\eta(a, b, c) = \sum_{i=0}^{I-1} \delta(c - [z_i - g_a(\lambda_i - b)]) = \sum_{i=0}^{I-1} \delta(c - [f_a(b - \lambda_i) + z_i]). \quad (1\text{-}27)$$

The point of maximum $(a_0,b_0,c_0)$ in the three-dimensional parameter space, defined by $$\eta(a_0, b_0, c_0) = \max_{\substack{a_{min}<a<a_{max} \\ b_{min}<b<b_{max} \\ c_{min}<c<c_{macx}}} \eta(a, b, c) \quad (1\text{-}28)$$

shall be determined because the parameter set $(a_0,b_0,c_0)$ defines that COSH-curve which intersects a maximum number of measurement points (histogram principle of Hough transform).

In practical applications, a quantization of the parameter space is again required, specified by three positive numbers $\Delta a$, $\Delta b$, $\Delta c$. For every discrete value $$a_j=a_{min}+j\cdot\Delta a(j=0 \ldots J-1; (J-1)\Delta a=a_{max}-a_{min}) \quad (1\text{-}29)$$

of the slack parameter a, individual, two-dimensional, discrete histogram functions $H_j(b_m,c_n)$ are introduced which correspond to the continuous, two-dimensional histogram functions $\eta(a_j,b,c)$ for fixed $a=a_j$:

$$H_j(b_m,c_n) \Leftrightarrow \eta(a_j,b,c) \quad (1\text{-}30)$$

The computation and simultaneous storage of all the functions $H_j(b_m,c_n)$ is performed by the acceleration board. In the course of determining the point of maximum, all J functions are then evaluated, not just—as in the case of the horizontal line search—a single two-dimensional function. The detailed description of the interface with the board is described in section 1.3.4.

1.3.3 Fuzzy Hough Transform and Iteration

A solution $(a_{j_0},b_0,c_0)$ is efficiently found using the acceleration board. However, at this point the evaluation of the measurement points in the current vertical plane is not yet complete. The solution is amenable to improvement, by an application of the fuzzy Hough transform, and moreover, additional segments of wire may be present and must be detected. The procedure is generally the same as in section 1.2.3 and therefore is not repeated here.

1.3.4 Interface with Acceleration Board

Parameter Space

The parameters of the Hough transform domain are $$b_{min}<b<b_{max}, c_{min}<c<c_{max} \quad (1\text{-}31)$$

with discretization parameters $\Delta b$, $\Delta c$.

One-parametric Set of Curves

Let $$a_j=a_{min}+j\cdot\Delta a(j=0 \ldots J-1; (J-1)\Delta a=a_{max}-a_{min}) \quad (1\text{-}32)$$

denote a discretization of the slack parameter a. The following set of curves is defined:

$$c = f_j(b) = -a_j \cosh\left(\frac{b}{a_j}\right) \quad (j = 0 \ldots J-1). \quad (1\text{-}33)$$

Association of Curves with Measurement Points

Every measurement point $P_i=(\lambda_i, z_i)$ is associated with the same curve of the set. However, for each $j=0, \ldots, J-1$, a two-dimensional Hough transform is performed, with the respective curves $c=f_j(b-\lambda_i)+z_i$ (three-dimensional mode of board). The offset values with respect to the b- and c-axis thus are $\lambda_i$ and $z_i$, respectively.

2. Acceleration Board for Fast Hough Transform 2.1 Overview

In the preceding section, the algorithmic procedure for wire detection has been described. It clearly depends heavily on the discrete Hough transform in two versions. For the implementation of the Hough transform as real-time software, commercial processors presently available are not sufficiently powerful. On the other hand, the core of the conventional Hough transform does not require complex floating point operations. In view of the real-time performance of the processing hardware under the constraints of minimum mass and power requirements, the development of an acceleration board is desirable which is dedicated to the functions of the Hough transform.

The present section describes such a board. We begin by defining the mathematical function of the board in section 2.2.1. Either Hough transform (HT) can be executed based on this function, the HT for horizontal line detection (section 1.2) as well as the HT in vertical planes for the detection of slack wires (section 1.3). In sections 2.2.2 and 2.2.3, the mathematical function of the board is reduced to a simple algorithm which merely consists of the addressing of memory cells and the addition or subtraction of a 1 to or from the cell values. In section 2.3, an architecure is described which constitutes an efficient implementation of this algorithm in hardware.

2.2 Logical Function 2.2.1 Mathematical Formulation

In this section, the mathematical function of the acceleration board is formulated. For improved readability, this function is initially given a continuous formulation. The numerical evaluation however is discrete (cf. sections 2.2.2 and 2.2.3).

Input: A set of measurement points, a two-dimensional, rectangular (bounded) parameter space, and a discrete set of curves are given. A unique curve from the set is associated with each measurement point; in addition, this curve may be dilated horizontally or vertically in the parameter space using offsets which are also uniquely associated with the respective point. The parameter space is sized such that no curve will meet or exceed its upper or lower boundaries; a curve perhaps exceeding the parameter space at the left or right hand side boundaries, however, is cut off at these boundaries.

The mathematical formulation of this input is:

parameter p,q
parameter space $p_a \leq p \leq p_b$; $q_a \leq q \leq q_b$
set of curves $q=f_l(p)$ with domains $s_l \leq p \leq t_l$ ($l=0,1,\ldots,L-1$)
measurement points $P_i$ ($i=0,1,\ldots,I-1$)

With each measurement point, the following quantities are uniquely associated:

curve index $l(i)$ offset values $p_i$, $q_i$ curve graph $\Gamma_i =$ $$\{(p, f_{l(i)}(p - p_i) + q_i) | \max\{p_a, s_{l(i)} + p_i\} \leq p \leq \min\{p_b, t_{l(i)} + p_i\}\}$$

The graph of the associated curve is fully contained in the parameter space, i.e.

$q_a \leq f_{l(i)}(p-p_i)+q_i \leq q_b$ for all admissible values of $p$

Board function: The graphs of all measurement points are entered into the parameter space; after this, at every point in the parameter space the number of graphs intersecting this point is counted. The parameter point where a maximum number of graphs intersect is determined.

In mathematical terms this means that the function $$H(p, q) = \sum_{i=0}^{I-1} \delta(q - [f_{l(i)}(p - p_i) + q_i])$$

is to be evaluated in the complete parameter space $p_a \leq p \leq p_b$; $q_a \leq q \leq q_b$. Again we let $\delta(0)=1$ and $\delta(x)=0$ for all $x \neq 0$ The final result is a point $(\bar{p},\bar{q})$ of the parameter space for which the following identity holds with respect to the complete parameter space:

$$H(\bar{p},\bar{q}) = \max_{p,q}\{H(p,q)\}.$$

In some cases (three-dimensional HT) the set of curves will consist of just a single curve $f$. On the other hand, in these cases the Hough transform shall be conducted several times for all measurement points, each time however with a new parameter space and a different curve $f_j$. The sequence of individual transforms is indexed by $j(0 \leq j \leq J-1)$, and every one of the following functions is determined:

$$H_j(p, q) = \sum_{i=0}^{I-1} \delta(q - [f_j(p - p_i) + q_i])$$

The desired result is a point $(\bar{p},\bar{q})$ and a parameter $\bar{j}$ such that:

$$H_{\bar{j}}(\bar{p},\bar{q}) = \max_{p,q,j}\{H_j(p,q)\}$$

2.2.2 Quantization

The algorithm which in section 2.2.1 has been described using real analysis (continuous mathematics) is implemented discretely using quantization parameters $\Delta p > 0$, $\Delta q > 0$. The additional parameters $p_a, p_b, p_i, s_l, t_l$ are always chosen to be integral multiples of $\Delta p$, likewise the parameters $q_a, q_b$ which are integral multiples of $\Delta q$.

Figure 5:
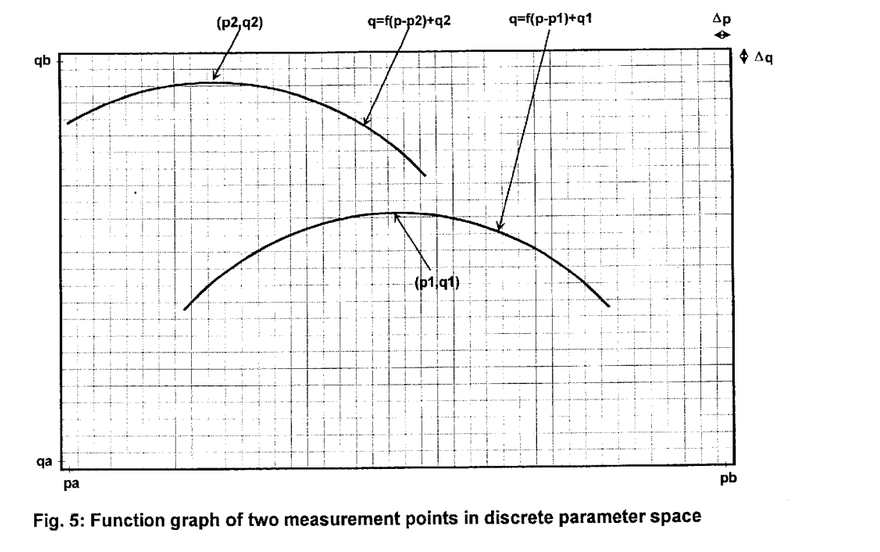
FIG. 5 is a function graph of two measurement points in discrete parameter space.

FIG. 5 illustrates two function graphs in a p,q-parameter space. The underlying curve in both cases is the same:

$$f_{l(1)}(q) = f_{l(2)}(q) = f(q)$$

The domains of definition are also the same:

$$s_{l(1)} = s_{l(2)} = s, \ t_{l(1)} = t_{l(2)} = t$$

However, the respective offsets $p_1, q_1$ and $p_2, q_2$ differ. While the first graph is fully contained in the parameter space, the second is cut off by the left boundary of the space. In q-direction, the parameter space must be sufficiently extensive to warrant that no potential curve will touch or cross the respective (upper and lower) boundaries.

Each square in the parameter space constitutes a discrete bin of size $\Delta p \cdot \Delta q$. The desired discrete histogram function $H(p_m,q_n)$, which is defined at every bin $(p_m,q_n)$, in this example would only assume the values 0 and 1:1 along the curve trajectories; and 0 everywhere else. If the two curves in FIG. 5 would intersect, the histogram function would assume the value 2 at the bins of intersection.

Figure 6:
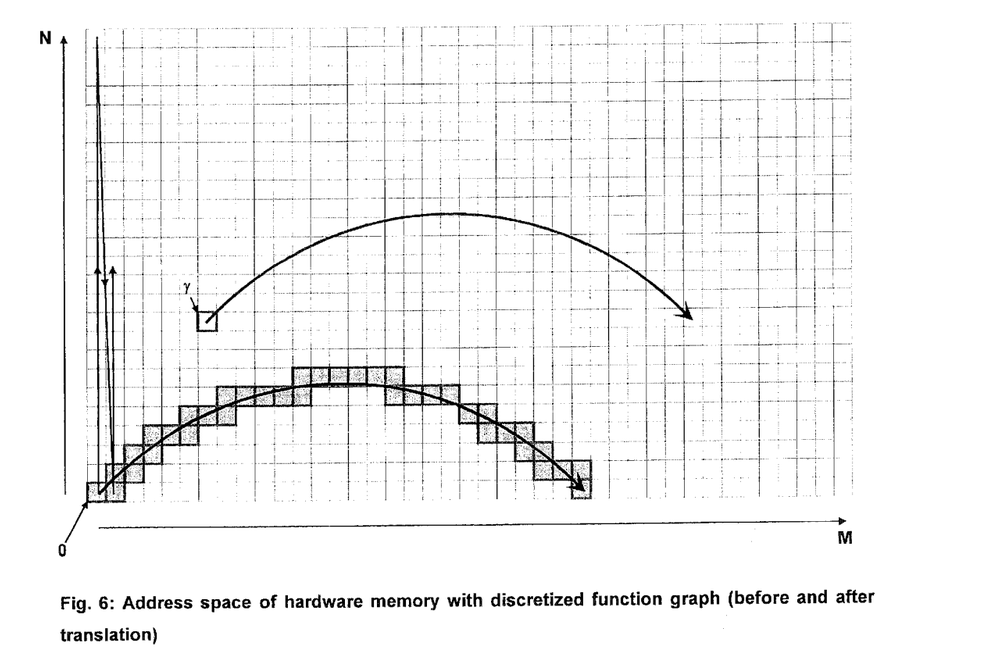
FIG. 6 shows address space of a hardware memory with quantized function graph (before and after translation)

In the electronic implementation by means of the acceleration board, every bin is represented by an address register; i.e., the parameter space is the address space of one or more memory devices. In FIG. 6 it is shown how the linear (one-dimensional) address space of the memory device is mapped onto the two-dimensional, discrete parameter space of the present problem consisting of M bins in p-direction and N bins in q-direction. Addressing starts at the lower left of the parameter space and proceeds columnwise, moving from left to right.

FIG. 6 also illustrates the quantization of a particular curve $$q = f_l(p)$$

of the set. With the curve, an array of addresses $$\{\phi_l(k)|(0 \leq k < K_l)\}$$

is associated (gray shaded bins in FIG. 6). The addresses belong to all bins which are intersected by the curve. Presently, the starting point of the curve $s_l$ is placed at the "origin" $(p_a,q_a)$ of the parameter space (lower curve in FIG. 6), resulting in the first curve address always to vanish:

$$\phi_l(0) = 0$$

Later, when the curve is translated in parameter space in accordance with the prescribed offsets $p_i,q_i$, it starts at a bin with the address $\gamma(i)$. [The bin contains the point $(p,q)=(s_l-p_i,f_l(s_l-p_i)+q_i)$]. The translated curve $$q = f_l(p-p_i)+q_i$$

(upper curve in FIG. 6) now encompasses the addresses $$\{\gamma(i)+\phi_l(k)|(0 \leq k < K_l)\}.$$

This means that addresses of the translated curve are obtained simply by adding $\gamma(i)$—i.e. an address which is uniquely associated with the current measurement point—to the sequence of addresses of the "normal" curve.

In summary, the quantization consists of the mappings $$P_i \rightarrow \gamma(i)(i=0,\ldots,I-1)$$

$$f_l(p) \rightarrow \{\phi_l(k)|0 \leq k \leq K_l-1\}(l=0,\ldots,L-1)$$

resp.

$$f_j(p) \rightarrow \{\phi_j(k)|0 \leq k \leq K_j-1\}(j=0,\ldots,J-1)$$

That is, to every measurement point a single address, and to every curve a sequence of addresses, is assigned. The values of the addresses depend on the bounds of the parameter space and the selected bin size. The input of the acceleration board consists of the following discrete quantities:

Parameters: M,N
Measurement data: $I,\gamma(i),l(i)$ $(i=0 \ldots I-1)$
Curve data:
$L,K_l,\phi_l(k)$ $(l=0 \ldots L-1, k=0 \ldots K_l-1)$
resp.
$J,K_j,\phi_j(k),\psi(j)$ $(j=0 \ldots J-1, k=0 \ldots K_j-1)$
($\psi(j)$ is the first address of the two-dimensional parameter subspace associated with $a_j$, cf. Abs. 2.2.3. It only occurs in the case of a three-dimensional HT.) A major part of this data (the curve data) may be computed and sent to the board in advance of the actual obstacle processing, as this data does not change in the course of the repeated execution of the Hough transform, despite changing measurement data.

2.2.3 Steps of Computation

The following are the steps of computation of the board:
1. Input of parameter space size values M, N.
2. Input of L or J address sequences $$\{\phi_l(k)|(0 \leq k < K_l)\} \ l=0,\ldots,L-1$$

resp.

$$\{\phi_j(k)|(0 \leq k < K_j)\} \ j=0,\ldots,J-1$$

These sequences of addresses are the discrete counterpart of the set of curves.

3. Input of I initial addresses $$\gamma(i) i=0,\ldots,I-1$$

and curve parameters resp. subspace address offsets $$l(i) i=0,\ldots,I-1$$

resp.

$$\psi(j) j=0,\ldots,J-1.$$

The initial addresses correspond to the I measurement points. They implicitly contain the offset values $p_i,q_i$. In the three-dimensional case, the parameter space must be created J-times. The j-th subspace is located in the address range $$\psi(j) \ldots \psi(j+1)-1$$

Usually, $\psi(j)$ computes to $\psi(j)=j \cdot M \cdot N$.

4. Execution of a two-resp. threefold nested loop for the computation of the histogram function:

for $j=0 \ldots J-1$ loop - - - ($J=1$ resp. $J>1$)

for $i=0 \ldots I-1$ loop $l:=l(i)$; resp. $l:=j$;

$a0:=\gamma(i)$; resp. $a0:=\gamma(i)+\psi(j)$;

for $k=0 \ldots K_l$ loop address:=$a0+\phi_l(k)$;

data(address):=data(address)+1;

end loop $k$;

end loop $i$;

end loop $j$;

Data (address) denotes the value of the memory device at the particular address.

5. Read out the complete address space, determine the maximum value T of data ( ) in the complete address space, determine an address $\bar{\gamma}$ such that $$\text{data}(\bar{\gamma})=T.$$

6. Output $\bar{\gamma}$ and T. From $\bar{\gamma}$, the desired parameters of maximization $(\bar{p},\bar{q})$ resp. $(\bar{j},\bar{p},\bar{q})$ can be computed (externally to the acceleration board).

2.3 Architecture
2.3.1 Function

Figure 7:
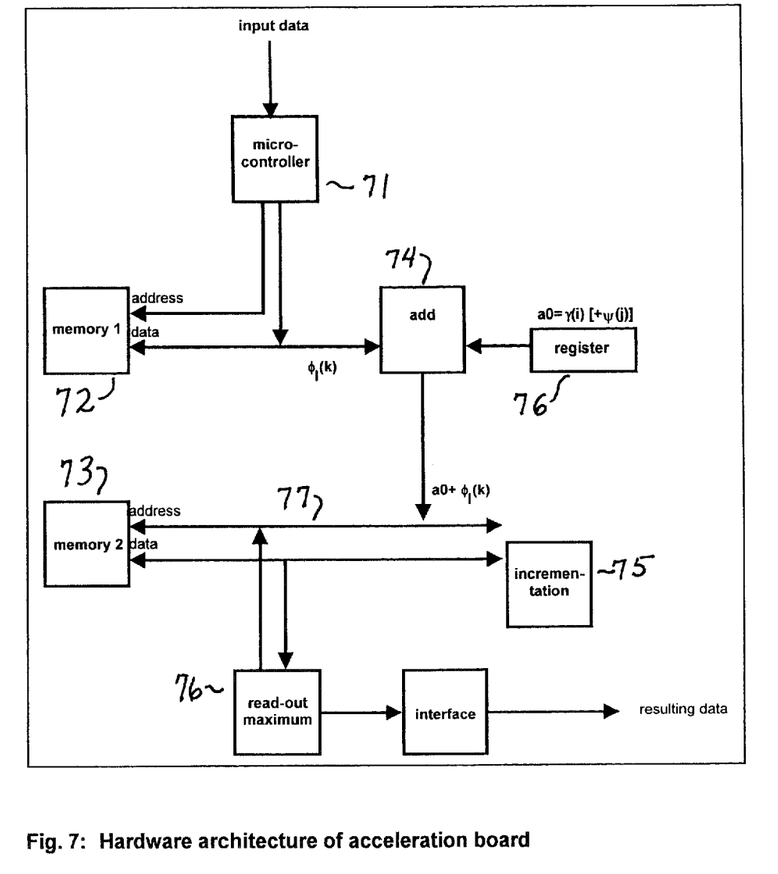
FIG. 7 shows the hardware architecture of an acceleration board to be applied by the invented procedure.

The architecture displayed in FIG. 7 serves to implement the functional procedure defined in section 2.2.3; that is, input of data, output of resulting data, and, more significantly, efficient execution of the two- or three-fold nested loop in accordance with section 2.2.3, point 4.

A micro-controller 71 receives the input data and controls the remaining functional modules. A memory bank ("memory 1") 72 stores the curve data $\phi_j(k)$ and the measurement data $\gamma(i)$. A second memory bank ("memory 2") 73 stores the actual histogram data—data(address).

The architecture furthermore comprises a fixed-point, 16 bit adding unit 74, an incrementation unit 75, and a module "read out maximum" serving to find the maximum value of data ( ). A register 76 is connected to the output of the adding unit on demand and supplies the second operand for the adding procedure.

During the first step of a commanded Hough transform, the micro-controller 71 (providing the external interface) loads the required curve and measurement data into memory 1. Only the measurement data is reloaded for a later reiteration of the same Hough transform.

The actual HT is executed in the course of the following step; i.e., the histogram array data(address) is summed according to point 4 of section 2.2.3. Initially, for every measurement point the register a0 is loaded with the value $\gamma(i)$ or $\gamma(i)+\psi(j)$, depending on whether the two- or the three-dimensional HT is required. To obtain the curve $\phi_1(k)$ which is associated with the current measurement point, the sums address=a0+$\phi_1(k)$ must be performed one by one. This summation must execute in no more than 3 cycles, and the result address must be passed on to memory 2 as the current address value. This is why the output of the adding unit is directly connected with the address bus 77 of memory 2. While address is active at memory 2, the corresponding data value data(address) must be read out, incremented or decremented by 1, and written back. (This is why the summation above must execute in three cycles at most.) Incrementation is applied during histogram generation for the first search of a line or a slack wire from a given measurement point set; for the search of additional lines or wires from the same point set, decrementation is applied (cf. section 1.2.3).

The operation just described essentially drives the computational performance of the board, and for an optimum implementation requires 3 clock cycles. Therefore, a specialized fast incrementation module is supplied. The adding unit only needs to be as fast as this module. Once the calculation of data(address) has been completed, memory 2 finally must be read out, and the maximum value of data ( . . . ) and an address where that maximum is attained must be determined and output. This procedure is second most relevant in determining the overall speed of the board and is therefore also executed by an optimally implemented hardware module. Alternatively, it might be executed by the micro-controller which in this case must be connected with memory 2 (not shown in FIG. 7).

2.3.2 Estimation of Processing Performance

In this section, the processing performance of the architecture described in the last section is estimated. The superior throughput performance of the acceleration board in comparison with a software implementation is due to the fact that its architecture does not require multiplication or floating point operations, dedicated specifically to the requirements of the Hough transform.

The processing performance is estimated only for the detection of slack wires, since this task is far more demanding than the detection of horizontal lines. For the present estimation we shall assume the following typical figures:

4 images to be processed per second;
20 straight lines resulting from the first HT (per image);
40 measurement points per vertical plane in which to search for slack wires;
40 different values of the "slack" parameter as;
100 addresses per graph of a measurement point;
3 clock cycles for each incrementation/decrementation of a histogram cell;
2 time factor for finding the complete set of slack wires as compared to merely finding the first one.

The product of these figures amounts to approximately 80 million clock cycles and corresponds to the generation of the histogram function. For the evaluation of the histogram function—accomplished by reading out the memory—the following figures are relevant:

4 images per second;
20 straight lines resulting from the first HT (per image);
5 slack wire segments detected per straight line (yielding 100 wire segments altogether);
40 different values of the "slack" parameter $a_j$;
10000 bins in the discrete (b,c)-parameter space;
1 clock cycle for reading out a histogram value.

The product of these figures amounts to 160 million cycles, hence 240 million cycles to be performed per second altogether. Since clock cycles of 250 MHz are feasible for commercial memory devices and processors, the potential real-time performance of the invention has been shown. Moreover, the figures assumed above are not particularly optimistic; in many practical instances, they will assume smaller values. Finally, a further reduction of processing time requirements can easily be achieved by employing multiple acceleration boards which operate in parallel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for real-time wire detection for an aircraft, said process comprising:

scanning of a field of view ahead of the aircraft by means of a range image sensor;

generating a set of measurement points, using information output by the range image sensor and information output by a navigation system as input, a measurement point being defined by its three position coordinates in a terrestrial coordinate system;

eliminating from the set of measurement points those measurement points from the point set which correspond to ground;

detecting horizontal lines within the set of measurement points, employing a Hough transform; and detecting slack wires within vertical planes which contain a detected horizontal line, employing a Hough transform;

wherein execution of each Hough transform is performed in two stages, the first stage being a discrete Hough transform, and the second being a fuzzy Hough transform.

2. The process according to claim 1, wherein execution of the discrete Hough transform for the detection of a horizontal line or vertical slack wire comprises:

mapping the parameter space of the Hough transform on an address space of a hardware memory device, such that a function graph of the Hough transform associated with a measurement point is represented as a sequence of addresses of the memory device and the corresponding storage cells are incremented, this procedure being repeated for the function graphs of all measurement points; and after looping through the set of measurement points, determining a cell bearing the largest value, a position of the determined cell within the address space yielding defining parameters of the detected horizontal line or slack wire.

3. The process according to claim 2, wherein:

after detecting a horizontal line or slack wire it is determined which measurement points lie exactly or approximately on the detected line or wire, within the admitted bounds of fuzziness;

function graphs of the Hough transform associated with the determined measurement points are represented in the address space such that the corresponding storage cells are decremented; and a storage cell bearing the largest value is determined, its position within the address space yielding the defining parameters of another horizontal line or slack wire to be detected.

4. Apparatus for real-time obstacle detection for an aircraft, said apparatus comprising:

a range image sensor mounted on said aircraft for scanning a field-of-view ahead of the aircraft;

a navigation system mounted on said aircraft;

a data processor; and an HT acceleration board;

wherein said data processor and said HT acceleration board are configured for cooperation to perform the following steps, generating a set of measurement points, using information output by the range image sensor and information output by a navigation system as input, a measurement point being defined by its three position coordinates in a terrestrial coordinate system;

eliminating from the set of measurement points those measurement points from the point set which correspond to ground;

detecting horizontal lines within the set of measurement points, employing a Hough transform; and detecting slack wires within vertical planes which contain a detected horizontal line, employing a Hough transform;

wherein execution of each Hough transform is performed in two stages, the first stage being a discrete Hough transform, and the second being a fuzzy Hough transform.

5. The apparatus according to claim 4, wherein said HT acceleration board comprises:

a microcontroller for receiving input data and controlling sequencing of processing in said HT acceleration board;

a first memory for storing curve data and measurement data;

a second memory for storing histogram data;

a 16 bit addition unit, connected to receive and process data from said first memory and to store processing results in said second memory;

a register which is connectable on demand to an output of the addition unit, for supplying an operand to said addition unit;

an incrementation unit for incrementing or decrementing by 1 data stored in the second memory; and a read out maximum unit for reading a maximum value of data stored in said second memory.

6. Apparatus for real-time obstacle detection for an aircraft having a range image sensor for scanning a field of view ahead of the aircraft and a navigation system for generating information concerning position and attitude of said aircraft, said apparatus comprising:

a data processor; and an HT acceleration board;

wherein said data processor and said HT acceleration board are configured to cooperate in performing the following steps, generating a set of measurement points, using information output by the range image sensor and information output by a navigation system as input, a measurement point being defined by its three position coordinates in a terrestrial coordinate system;

eliminating from the set of measurement points those measurement points from the point set which correspond to ground;

detecting horizontal lines within the set of measurement points, employing a Hough transform; and detecting slack wires within vertical planes which contain a detected horizontal line, employing a Hough transform;

wherein execution of each Hough transform is performed in two stages, the first stage being a discrete Hough transform, and the second being a fuzzy Hough transform.

7. The apparatus according to claim 6, wherein said HT acceleration board comprises:

a microcontroller for receiving input data and controlling sequencing of processing in said HT acceleration board;

a first memory for storing curve data and measurement data;

a second memory for storing histogram data;

a 16 bit addition unit, connected to receive and process data from said first memory and to store processing results in said second memory;

a register which is connectable on demand to an output of the addition unit, for supplying an operand to said addition unit;

an incrementation unit for incrementing or decrementing by 1 data stored in the second memory; and a read out maximum unit for reading a maximum value of data stored in said second memory.

* * * * *